United States Patent [19]

Moyle et al.

[11] Patent Number: 5,178,915
[45] Date of Patent: Jan. 12, 1993

[54] COATING COMPOSITION AND METAL COIL COATING PROCESS EMPLOYING SAME

[75] Inventors: Richard T. Moyle; Jeffrey N. Soltwedel, both of Pataskala, Ohio

[73] Assignee: Morton International, Inc., Chicago, Ill.

[21] Appl. No.: 818,821

[22] Filed: Jan. 10, 1992

[51] Int. Cl.$^5$ .................. C08K 5/3492; B05D 7/14
[52] U.S. Cl. ................................ 427/318; 427/327; 427/409; 428/371; 428/421; 428/422; 524/100; 524/102; 524/247; 524/391
[58] Field of Search .............. 525/386, 326.2, 124, 525/158; 524/100, 102, 391, 247; 428/371, 421, 422; 427/318, 327, 409; 546/208

[56] References Cited

U.S. PATENT DOCUMENTS

| | | | |
|---|---|---|---|
| 4,015,057 | 3/1977 | Gall | 525/104 |
| 4,345,057 | 8/1982 | Yamabe et al. | 526/247 |
| 4,436,772 | 3/1984 | Yamabe et al. | 427/379 |
| 4,487,893 | 12/1984 | Yamabe et al. | 525/326.2 |
| 4,619,956 | 10/1986 | Susi | 524/100 |
| 4,690,968 | 9/1987 | Mitani et al. | 525/124 |
| 4,916,188 | 4/1990 | Reising | 525/124 |
| 4,987,204 | 1/1991 | Murachi | 528/59 |
| 5,010,121 | 4/1991 | Yeates et al. | 523/336 |

OTHER PUBLICATIONS

Gilliam, R. E. et al., Novel Fluoropolymer Resins for Premium Durability Coatings 1990 FSCT Annual Meeting, Oct. 1990.
Tool & Mf'g Engineers Handbook, vol. 3, Mat'l, Finishing & Coating, Chapter 19, pp. 19-22 to 19-25, 4th ed., Charles Wick et al., editors.
CYMEL 325 Resin, Product Bulletin CRT-116A, 3 pages, American Cyanamid Co., (undated).
CYMEL 327 Resin, Product Bulletin CRT-538A, 8 pages, American Cyanamid Co., (undated).
BYK-321 Product Bulletin, 1 page, BYK-Chemie USA Jun. 1984.
BYK-321 Material Product Safety Sheet, 2 pages, BYK-Chuemie USA, Jul. 1, 1990.
BYK-310 Material Safety Data Sheet, 2 pages, BYK-Chemie USA, Jul. 1, 1990.
CYANAMID UV-1164L, Material Safety Data Sheet, 3 pages, American Cyanamid Co., Apr. 26, 1991.
CYANAMID UV-1164 & UV-1164L Light Stabilizer, Product Bulletin, 3 pages, American Cyanamid Co., (undated).
Product Bulletin Sandoz 3058 (UV-3668), 1 page, Sandoz Chemical Co., (undated).
Yamabe, M. et al., New Fluoropolymer Coatings, Organic Coatings, vol. 7, pp. 357-374, 1984.
Product Bulletins & literature, Lumiflon Fluoropolymer Resins, 27 pages, ICI Specialty Chemicals, attached to Aug. 14, 1990 letter to Morton Specialty Finishes.

Primary Examiner—Veronica P. Hoke
Attorney, Agent, or Firm—George W. Rauchfuss; Gerald K. White

[57] ABSTRACT

Coating composition especially useful for high gloss coating of untreated, bright, sealed, anodized metal substrates, particularly coils of such metal, comprises a catalyst-free composition comprising a high gloss, thermosetting, hydroxyl group-containing fluorocarbon polymer, a cross-linking agent comprising a blocked aliphatic polyisocyanate, a partially self-condensing, highly methylated melamine-formaldehyde resin or a mixture of the blocked polyisocyanate and melamine-formaldehyde resin, butanol solvent, an ultraviolet screening agent, an ultraviolet stabilizer acting as free radical scavenger, and optionally one or more of the following components: polysiloxane slip and flow and defoaming agents, a high boiling solvent distilling at a temperature of about 195° C. or above to modify the viscosity of the composition and an amine active as an inhibitor for residual acid in the fluoropolymer.

31 Claims, No Drawings

COATING COMPOSITION AND METAL COIL COATING PROCESS EMPLOYING SAME

FIELD OF THE INVENTION

This invention relates to compositions useful for coating untreated, bright, sealed, anodized metal substrates, especially bright, sealed, anodized aluminum substrates, particularly coils of such metal substrates. More particularly this invention relates to compositions for coating high gloss coils of such metal substrates whereby the coating adheres to the substrate sufficiently to permit post-coating forming, molding, bending or shaping of the metal into suitable parts, especially for use as components of automotive trim, without the coating delaminating or flaking from the substrate and said coating also being resistant to hazing, clouding, flaking, delamination and loss of gloss under conditions of use where the coated metal is exposed to the harmful effects of ultraviolet light and environmental corrosive factors such as road salt. The invention also relates to a process for coating coils of such metal substrates to obtain the aforementioned properties as well as providing a high gloss coated coil of such metal substrate in which the coated coil does not block or stick or is prevented from unrolling for use. The invention also relates to such high gloss coating compositions for said metal substrates which coated substrates are printable.

BACKGROUND OF THE INVENTION

Coatings have long been available which adhere to a wide variety of metals including for example, cold rolled steel, hot-dipped galvanized steel, electrogalvanized steel and aluminum and anodized metal, particularly anodized aluminum. The coil coatings and industrial coatings industries, for a number of years, have successfully coated unsealed, anodized metal substrates which have been anodized by an electrochemical process employing sulfuric acid, chromic acid, phosphoric acid, or oxalic acid electrolytes. Such unsealed, anodized metal substrates provide an excellent base for adhesion of a paint, enamel or lacquer coating because of the porosity of the anodized metal surface. Clear methacrylate lacquers have been known for years to be useful to paint such unsealed, anodized metal surfaces to provide a high gloss coating.

It has also been known to seal such anodized metal substrates where it is desired to employ the metal in an environment where the porosity f the anodized metal is undesirable, such as for example when used in auto trim parts where exposure to the elements can result in corrosion or staining of the metal. Sealing of such anodized metal substrates, such as by immersion in boiling deionized water, sodium bichromate, nickel acetate solutions or steam, makes the anodized coating on the metal non-absorptive by closing down or plugging the pore structure of the anodized coating. Additionally, sealing of the anodized metal substrate can substantially reduce the abrasion resistance thereof. When anodized metal substrates have been sealed, it is very difficult for a paint to adhere to the surface of the sealed, anodized metal substrate. The problem is exacerbated when it is desired to coat untreated bright, sealed, anodized metal substrates, particularly untreated, bright, sealed, anodized aluminum substrates.

Furthermore, in producing bright, unsealed, anodized metal parts for use as auto trim and the like, it has been necessary to first fabricate the desired part, then anodize the metal substrate before applying a high gloss coating to the anodized metal part. The part forming process would result in cracking and delamination due to lack of sufficient adhesion of the high gloss coating if said coating were applied before the part fabrication step. Moreover, the clear methacrylate lacquers employed for the high gloss coating are generally spray painted onto the prefabricated part and air dried since long baking times typical of spray coatings would discolor the anodizing. As stated hereinbefore, such problems are magnified many times over when it is desired to provide a high gloss coating on bright, untreated, sealed, anodized metal substrates and therefore it has not been possible to successfully coat such metal substrates in coil form and thereafter fabricate parts from the coated metal coil substrate.

Currently the metal employed in such automotive trim parts is stainless steel. It would be especially desirable if said stainless steel parts could be replaced with untreated, bright, sealed, anodized aluminum since the latter substantially reduces galvanic corrosion compared to the former. Thus, it would be highly desirable to be able to coat untreated, bright, sealed, anodized aluminum substrate in coil form with a high gloss coating and to be able to thereafter fabricate parts therefrom.

Additionally, even if one were able to coat untreated, bright, sealed, anodized metal substrate in coil form with a high gloss coating, it is also necessary that the coated coil not become blocked, i.e. that the coated coil is able to slide and unroll without sticking and binding. Furthermore, such a coating must be high gloss, i.e. produce at least 80 percent reflectance at a 60° angle.

It is therefore an object of this invention to provide a high gloss coating composition and the use thereof for coating untreated, bright, sealed, anodized metal substrates and more particularly to coat such metal substrates in coil form. A further object of this invention is to provide such a high gloss coating composition and process for coating such metal substrate whereby the resulting coating has sufficient integrity and adhesion to the metal substrate, particularly coiled metal substrates, to permit post-coating fabrication of the coated metal into suitable parts or elements, particularly parts or elements for use on automobiles. Another object of this invention is to provide such coatings which also exhibit sufficient stability and integrity to permit such high gloss coated metal substrates to resist corrosion, hazing, cloudiness, flaking, cracking, mottling and/or delamination of the coating when exposed to environmental factors such as salt, ultraviolet light and excessive heat.

A still further object of this invention is to provide a high gloss coating composition for such metal substrates which avoids problems with the composition gelling during extended periods of storage at elevated temperatures up to about 120°-140° F. (49°-60° C.) prior to use in the coating process since such temperatures are commonly encountered in and around coil coating plants. Yet another object of this invention is to provide a high gloss coating composition for coating such untreated, bright, sealed, anodized metal substrates for producing high gloss coating on said substrates which coating is capable of having indicia printed therein, such as by a sublimation printing process. Another object of this invention is to provide such high gloss coated metal substrates capable of having elastomeric polymeric or rubber material bonded thereto, such as for example, the elastomeric material bonded to bright metal trim around automobile windows. It is still another object of this invention to provide a high gloss coating composition for coating untreated, bright, sealed, anodized metal substrates having a low coefficient of friction for slippage and mar resistance and to aid in forming the coating by ensuring adequate flow and levelling of the coating composition during the coating process.

BRIEF SUMMARY OF THE INVENTION

Coating compositions especially useful for high gloss coating of untreated, bright, sealed, anodized metal substrates, particularly such metals in coil form and especially untreated, bright, sealed, anodized aluminum in coil form, comprise a catalyst-free composition comprising a high gloss, thermosetting, hydroxyl group-containing fluorocarbon polymer, a cross-linking agent comprising, a blocked aliphatic polyisocyanate, a partially self-condensing highly methylated melamine-formaldehyde resin or a mixture of the blocked polyisocyanate and melamine-formaldehyde resin, butanol solvent, an ultraviolet screening agent, an ultraviolet stabilizer acting as a free radical scavenger and optionally one or more of the following components: polysiloxane slip and flow and defoaming agents, a high boiling solvent distilling at a temperature of about 195° C. or above and an amine acting as an inhibitor for residual acid in the fluoropolymer.

A catalyst must not be present in the coating composition since the presence of a catalyst leads to kick out (forming of seeds or crystals) or gelling of the resin composition with a significant viscosity increase which can even lead to solidification. Another drawback found to exist with the use of a catalyst is the formation of haze in the resin compositions in both the liquid and dry state. Thus, even though the prior art has taught the use of a catalyst for cross-linking hydroxyl group-containing fluorocarbon polymers with polyisocyanates or melamine-formaldehyde resins to produce coatings for other types of substrates, such as galvanized steel, stainless steel, copper, unsealed aluminum, glass or plastics such as polyesters, polyurethanes, nylon or polyvinyl chloride, for the particular combination of hydroxyl group-containing fluoropolymer, blocked polyisocyanate and melamine-formaldehyde resin required to give the desired high gloss coating on untreated, bright, sealed, anodized metal and particularly aluminum coil substrates in accordance with this invention, a catalyst must not be employed. Further, we have found that catalyst must not be employed in the coating composition regardless of the substrate involved.

In addition, the high gloss coating compositions must contain butanol solvent in an amount such that the butanol is from about 5 to about 25%, preferably about 10 to about 20%, and most preferably about 15% by weight of the total resin solids present in the coating composition in order to avoid gelling of the compositions and to permit the composition to endure extended periods of storage at elevated temperatures of up to about 120° to 140° F. (49° to 60° C.). In a coating composition containing about 60% solvent the butanol is present in the coating composition in an amount of from about 0.5 to about 12%, preferably about 1.0 to about 9.0% and more preferably about 6% by weight of the total coating composition.

It had previously been considered that fluoropolymer had sufficient ultraviolet resistance to not require the addition of ultraviolet stabilizers or UV screening agents. However, it has been discovered that for the high gloss coating compositions of this invention, for coating onto untreated, bright, sealed, anodized metal substrates, such additives are necessary to provide the desired UV and weathering characteristics, particularly when the composition is applied as a single coat on said metal substrates.

DETAILED DESCRIPTION OF THE INVENTION

The hydroxyl group-containing thermosetting fluorocarbon polymers employed int he coating compositions of this invention is basically an amorphous and alternating thermosetting polymer of a fluoroolefin and several specific vinyl monomers. Such polymers are produced from fluoroolefins such as tetrafluoroethylene or chlorotrifluoroethylene and vinyl monomers such as an alkyl vinyl ether, for example ethyl, butyl or cyclohexyl vinyl ethers, and a hydroxyvinyl ether such as 2-hydroxyethyl vinyl ether. Optionally said hydroxy group-containing fluoropolymer is reacted with a dibasic acid anhydride such as succinic anhydride to provide carbosy functionality in the polymer. A process for the preparation of such polymers is disclosed in U.S. Pat. No. 4,487,893 assigned to Asahi Glass Company, Ltd.

The hydroxy group-containing fluoropolymers useful in this invention have the idealized molecular structures:

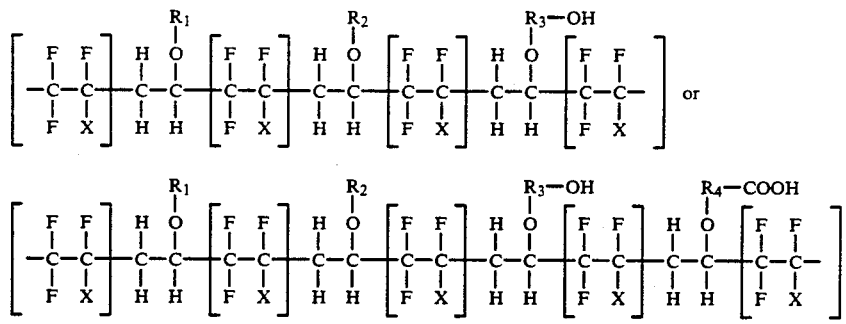

wherein X is chlorine or fluorine and $R_1$, $R_2$, $R_3$ and $R_4$ are alkyl or cycloalkyl; generally ethyl, butyl or cyclohexyl. The hydroxyl group-containing fluoropolymers useful in the coating compositions of this invention have a fluorine content of from about 20 to about 30% weight %, a hydroxyl value of from about 52 to about 57 mg KOH/g of solids, a carboxyl value of from zero up to about 5 mg KOH/g solids, a K-R viscosity (Gardner-Holt, 25° C.), a specific gravity of about 1.05 to about 1.06, a glass transition temperature of about 20° C., and a number average molecular weight of about 20,000. Such resins are commercially available from ICI Specialty Chemicals Division of ICI Americas Inc. as LUMIFLON fluoro resins. Examples of LUMIFLON resins meeting the aforesaid criteria and therefore useful as the hydroxy group-containing fluoropolymer component of the coating compositions of this invention are LUMIFLON 502 and LUMIFLON 552. These two polymer products are sold as 40% solids in Solvesso 150/cyclohexanone (80/20) solvent mixture.

The cross-linking agent required for the coating compositions of this invention is either a blocked aliphatic polyisocyanate, a partially self-condensing, highly methylated melamine-formaldehyde resin or a mixture thereof. Useful as the blocked aliphatic polyisocyanate component is a methyl ethyl ketoxime blocked hexamethylene diisocyanate trimer (an isocyanurate group-containing polyisocyanate prepared from hexamethylene diisocyanate blocked with methyl ethyl ketoxime), such as Desmodur BL 3175A available from Mobay Chemical Corp. which is sold as a 75% solids in Aromatic S-100 solvent. Said blocked isocyanate has an equivalent weight of about 372 and a blocked NCO content of about 11.3%. Useful as the partially self-condensing, highly methylated melamine-formaldehyde resins is a highly methylated melamine-formaldehyde resins such as CYMEL 325 resin and CYMEL 327 resin available from American Cyanamid Company. CYMEL 325 resin is a highly methylated melamine-formaldehyde resin, sold as about 72% solids (about 80% non-volatiles) in isobutanol solvent, having an X-$Z_1$ viscosity (Gardner-Holt, 25° C.), a specific gravity of the solution of about 1.12 and specific gravity of resin solids of 1.24 and having a low methylol content. CYMEL 327 resin is a highly methylated melamine-formaldehyde resin, sold as about 86% solids (about 90% non-volatiles) in isobutanol solvent, having a $Z_2$-$Z_5$ viscosity (Gardner-Holt, 25° C.), a specific gravity of the solution of about 1.18 and a flash point (Setaflash) of about 44° C.

When employing the blocked polyisocyanate as the cross-linking agent in the coating composition, the polyisocyanate is employed in an amount of from about 4 to about 30%, preferably about 5 to about 15% and most preferably about 11% by weight of the total coating composition or about 7.3 to about 54.5%, preferably about 9 to about 27.3% and most preferably about 20% by weight of total solids in the coating composition. When employing the highly methylated melamine-formaldehyde as the cross-linking agent, the resin is employed in an amount of from about 0.75% to about 15%, preferably about 1% to 10% and most preferably about 5% by weight based on the total solids contents of the coating composition. At amounts greater than about 15% flexibility of the resulting coating suffers and hazing of the coating can occur. When employing a mixture of the blocked polyisocyanate and melamine-formaldehyde resin, the polyisocyanate/melamine-formaldehyde resins are employed in a ratio of from about 2.0:1 to about 3.25:1, preferably at a ratio of about 2.2:1 by weight on a solids basis. The mixture is employed in an amount of from about 5% to 20%, preferably about 11% by weight of the total solids content of the coating composition.

Coating compositions for coating metal coils are often subjected to elevated temperatures during warehousing and shipping and especially during storage at coil coating plants where temperatures of about 120° to 140° F. (49° to 60° C.) may be encountered. These elevated temperature conditions can lead to gelling of coating compositions. However, with the coating compositions of this invention it has been discovered that such a problem can be essentially eliminated by employing butanol solvent in the high gloss coating compositions in an amount such that the butanol is about 5 to about 25%, preferably about 10 to about 20% and most preferably about 15% by weight of the total resin solids in the composition. Since the solvent components may generally comprise about 60% by weight of the total coating composition, the amount of butanol will generally be from about 0.5 to 12%, preferably about 1.0 to 9.0% and most preferably about 6% by weight of the total coating composition. The presence of such amounts of butanol in the coating composition permits the coating compositions to avoid gelling even when exposed for ninety days at temperatures up to about 140° F. (60° C.).

The coating composition of this invention also has present a suitable ultraviolet screening agent and an ultraviolet stabilizer acting as a free radical scavenger which do not adversely affect the desired properties of the high gloss coating for untreated, bright, sealed, anodized metal substrates. The ultraviolet screening agent is employed to screen harmful ultraviolet waves from the metal substrate or any base coat on the metal substrate to prevent the formation of haze. The ultraviolet screening agent is employed in an ultraviolet screening effective amount, an amount generally up to about 3%, preferably about 2% by weight based on the amount of total resin solids present in the composition. An example of a suitable ultraviolet screening agent is 2-[4,6-bis(2,4-dimethylphenyl)- 1,3,5-triazinyl-2-yl]-5-(octyloxy)phenol, sold as 65% solids in xylene as Cyanamid UV-1164L by American Cyanamid Company. As an ultraviolet stabilizer acting as a free radical scavenger one may employ a suitable hindered amine light stabilizer (HALS). As an example of a suitable ultraviolet stabilizer there may be mentioned a compound such as N-(N-acetyl-2,2,6,6-tetramethyl piperidyl)-4-dodecyl-2,5-pyrrolidinedione, sold as Sanduvor 3058 by Sandoz Chemicals Corp. The ultraviolet light stabilizer is generally employed in a stabilizer effective amount, generally an amount up to about 3%, preferably about 1% by weight based on the amount of total resin solids present in the coating composition. These ultraviolet screeners and stabilizers also increase the environmental ultraviolet and weathering resistance characteristics of the coated metal substrates.

The coating composition may have added thereto a high boiling solvent distilling at a temperature of about 195° C. or above in order to modify the viscosity of the coating composition for the coating process. As an example of such high boiling solvent to be used in this invention there may be mentioned mixtures of the refined dimethyl esters of adipic, glutaric and succinic acids available from E.I. DuPont de Nemours Co., particularly Dupont's product DBE comprising a mixture of from about 10 to about 25%, preferably about 15 to about 21%, dimethyl adipate, from about 45 to about 65%, preferably about 50 to about 60% by weight dimethyl glutarate, and about 20 to about 30%, preferably about 23 to about 29% by weight dimethyl succinate, said mixture having a distillation range of about 196 to 225° C., an autoignition temperature of about 370° C. and a specific gravity of about 1.086.

Also preferably present in the coating composition is an amine acting as an inhibitor to neutralize residual acid in the fluoropolymer until curing is desired. The amine acts as a blocking agent to inhibit residual acid from prematurely initiating the cross-linking process. The amine also acts with the previously mentioned butanol solvent to increase the shelf stability of the coating composition. Under curing conditions the amine volatilizes off and leaves a wet coating film and permits the residual acidity of the fluoropolymer to initiate curing. Such an amine inhibitor is required in the composition when melamine-formaldehyde resin is employed as a cross-linking agent in the composition. An especially preferred amine inhibitor is diisopropanolamine (DIPA). The amine is employed in an acid neutralizing effective amount, generally an amount of from about 0.01 to about 0.4%, preferably about 0.1% by weight based on the total coating composition. The amine is preferably added to the coating composition as a 50:50 mixture with butanol solvent. Thus, this 50:50 mixture is added to the coating composition in an amount of from about 0.02 to about 0.8%, preferably about 0.2% by weight based on the total coating composition to provide the desired level of amine initiator.

The coating composition also preferably contains a slip and flow and defoaming additive to lower the coefficient of friction of the coating to increase slippage and mar resistance and decrease blocking of the resulting coating and to aid in the formation of the coating by ensuring the proper flow and levelling characteristics of the coating composition. As an example of a slip and flow additive and defoaming additive there may be mentioned polysiloxane copolymers. Especially preferred for use is a polyether modified methylalkylpolysiloxane copolymer as a defoaming agent and a polyester modified polydimethylsiloxane as a slip and flow additive. As an example of a suitable polyether modified methylalkylpolysiloxane copolymer defoaming agent there may be mentioned BYK-321, sold as a 50% solids solution of said copolymer in butoxyethanol by BYK-Chemie USA. BYK-321 has a flash point (Setaflash) of about 58° C., a refractive index of between about 1.431 to 1.437, a specific gravity of about 0.92 g/cm$^3$ and a boiling point range of about 166 to 174° C. As an example of a polyester modified polydimethylsiloxane slip and flow agent there may be mentioned BYK-310, sold as a 25% solids solution in xylene by BYK-Chemie USA. BYK-321 (CAS#116810-47-0), described as silicones and siloxanes, dimethyl, 3-hydroxypropyl group-terminated diesters with poly(2-oxepanone), diacetates has a specific gravity of about 0.91 g/cm$^3$, a boiling range of from about 135 to 150° C., and a flash point (Setaflash) of about 25° C. The BYK-310 acts to lower the coefficient of friction of the coating composition. Most preferably a 50:50 mixture of BYK-321 and BYK-310 is employed. The amount of each ingredient employed is a defoaming effective amount and a slip and flow effective amount, respectively. Generally from about 0.05 to about 0.20% by weight (or 0.1 to 0.4% by weight of the 50:50 mixture) based on the total weight of the coating composition of each ingredient is employed.

In applying the high gloss coating compositions of this invention to untreated, bright, sealed, anodized metal, and particularly aluminum, substrates in coil form, it has been discovered that high heat conditions (peak metal temperatures) of about 520° F. (272° C.) are important to the physical properties of the coating. Additionally, peak metal temperatures of about 520° F. (272° C.) result in shorter coating cure times and improve the non-yellowing properties of the high gloss coatings of this invention.

The high gloss coating compositions of this invention may be used for coating untreated, bright, sealed, anodized metal substrates, particularly such metal substrates in coil form, especially aluminum substrates and most especially, untreated, bright, sealed, anodized aluminum substrates in coil form. Although the high gloss coating compositions of this invention have been developed for coating untreated, bright, sealed, anodized metal substrates, particularly in coil form, it will be appreciated that such coating compositions may also be used, if desired, for coating metal substrates other than untreated, bright, sealed, anodized metal substrates. For example, said coating compositions can be employed for coating a wide variety of unsealed metal substrates or as protective coating over previously coated substrates. It will also be appreciated that such coating compositions could be used to coat substrates other than metal, such as glass or other polymeric substrates.

The high gloss coating compositions of this invention may be used for coating substrates and can be applied in the same manner as known liquid coating materials are applied to substrates such as metal, glass, plastics or the like. Any suitable coating method may be used such as for example, brush, spray, roller or dipping and the like. However, as stated hereinbefore, the high gloss coating compositions of this invention are specially designed for providing high gloss coatings to untreated, bright, sealed, anodized metal substrates in coil form. The coating process employed may be any suitable coil coating process. However, the coil coating process is preferably conducted with a cure period of about 10 to 30 seconds and employs high temperature conditions (peak metal temperatures) of about 450° F. (232° C.) or higher, preferably at least about 490° F. (254° C.) or above, and most preferably about 520° F. (272° C.).

The high gloss coatings on untreated, bright, sealed, anodized metal coil substrates obtained according to this invention are characterized by excellent properties. Such coil coated metal substrates are stable and exhibit essentially no hazing, clouding, flaking or delamination and pass a 5B rating when stability tested by being immersed for 1 hour at 180° F. (82° C.) in a 5% sodium chloride solution in distilled water, in accordance with the test of procedure described in ASTM D3359, Method B, with the cross-hatched cuts being spaced 1.5 mm apart and with the Scotchguard 610 tape peel test completed within about 90 seconds of removal from the salt solution. Said high gloss coated metal coil substrates also exhibit essentially no hazing mottling or delamination at 2000 or more hours when QUV tested generally according to the procedures of ASTM G53 wherein the test sample is alternatively exposed to UV light (from about 270-340 nm) for eight hours at 70° C. and four hours of darkness at 100% relative humidity at 50° C.

Additionally, such high gloss coated metal coil substrates exhibit 80% or more reflectance at a 60° angle. The coated coils slide and unroll easily and are substantially devoid of any problem with blocking or sticking. Such coated coil substrates are also characterized by excellent adhesion characteristics such that the coated metal coil substrates can be formed into desired parts or elements without delamination or cracking of the coated metal substrates. In fact, coated coil substrates have been subjected to 2T (two thicknesses) bending (three 180° bends) without showing evidence of cracking or delamination of the high gloss coating when immersed in room temperature copper sulfate solution. Mar resistance of such coated coil substrates is excellent as is impact resistance of the coatings when subjected to an impact of 40 lbs/in² 28.124×10³ kgs/m². An additional advantage of the high gloss coated substrates of this invention is that the high gloss coatings are themselves printable.

The high gloss coating compositions of this invention and their use to coat untreated, bright, sealed, anodized metal substrates is illustrated by the following examples in which the parts and percentages are by weight unless specified otherwise.

EXAMPLE 1

In a stirred mixing tank 78.10 parts LUMIFLON 552 fluoropolymer, 10.81 parts Desmodur BL3175A blocked isocyanate and 5.27 parts DBE dibasic esters are charged and, with agitation at medium speed, 0.2 part BYK-321 (or optionally 0.1 part BYK-326 and 0.1 part BYK-310), 1.25 part Cyanamid UV-1164L, 0.40 part Sanduvor 3058 and 2.98 parts butanol are added thereto. Additional DBE is added to adjust the viscosity of the resulting composition to 28-32 sec., #4 Zahn. The resulting coating composition was applied to 0.020 inch thick untreated, bright, sealed, anodized aluminum substrate with a #32 drawn down bar and cured for 20 seconds at 650° F. (349° C.) with a peak metal temperature of about 490°-500° F. (254°-260° C.) to produce a 0.4-0.6 mil thick high gloss coating on the metal substrate.

EXAMPLE 2

In a mixing tank 85.75 parts LUMIFLON 552 fluoropolymer, 2.38 parts CYMEL 325 melamine-formaldehyde resin, 6.05 parts butanol and 2.00 parts DBE dibasic esters are charged and, with agitation at medium speed, is added a mixture of 0.10 part diisopropanolamine (DIPA) and 0.1 part butanol which has been prepared by mixing these two components in a separate mixing tank with heating until the DIPA is dissolved and then cooled. Thereafter, also added with agitation at medium speed, are 1.15 part Cyanamid UV-1164L, 0.40 part Sandovur 3058, 0.10 part BYK-321 and 0.1 part BYK-310. The viscosity of the resulting mixture is adjusted to 28-32 sec., #4 Zahn with the addition of 1.87 part additional DBE dibasic esters. The coating composition was applied to an 0.020 inch thick untreated, bright, sealed, anodized aluminum substrate with a #36 draw bar and cured for 20 seconds at 650° F. (343° C.) and at a peak metal temperature of about 450°-465° F. (232°-241° C.) to produce a 0.5-0.7 mil thick high gloss coating on the metal substrate.

EXAMPLE 3

In a mixing tank 86.52 parts of LUMIFLON 552 fluoropolymer is charged and, with agitation at medium speed, 6.0 parts butanol, 4.12 parts DBE dibasic ester, 4.12 parts Desmodur BL3175A blocked polyisocyanate, 1.54 part CYMEL 327 melamine-formaldehyde resin, 1.24 part Cyanamid UV-1164L and 0.40 part Sandovur 3058 are added. In a separate mixing tank 0.10 part diisopropanolamine (DIPA) and 0.10 part butanol are mixed with heating until the DIPA is dissolved, then cooled and added under medium agitation to the polymeric coating mixture in the first tank. The viscosity of the resulting solution is adjusted to 28-32 sec., #4 Zahn with the addition of DBE dibasic esters. The resulting coating composition when coated on an 0.020 inch thick untreated, bright, sealed, anodized aluminum substrate with a #36 draw bar and cured for about 15 seconds at 650° F. (343° C.) and at a peak metal temperature of about 450°-465° F. (232°-241° C.) produces a 0.45-0.55 mil high gloss coating on the metal substrate.

EXAMPLE 4

Into a mixing tank is charged 86.05 parts LUMIFLON 552 fluoropolymer and 5.83 parts butanol and, with agitation at medium speed, 4.10 part Desmodur BL3175A polyisocyanate, 1.73 parts CYMEL 325 melamine-formaldehyde resin, 1.24 parts Cyanamid UV-114L and 0.40 part Sandovur 3058 are added. In a separate mixing tank 0.10 part diisopropanolamine (DIPA) and 0.10 part butanol are mixed with heating until the DIPA is dissolved, then cooled and added under medium agitation to the polymeric coating mixture in the first tank. After adding 0.1 part BYK-321 and 0.1 part BYK-310 with medium agitation, the viscosity of the resulting coating composition is adjusted to 28-32 sec., #4 Zahn with 0.25 part DBE dibasic esters. The resulting coating composition applied to an 0.020 inch thick untreated, bright, sealed, anodized aluminum substrate with a #40 draw bar and cured for about 20 seconds at 650° F. (343° C.) and at a peak metal temperature of about 450°-465° F. (232°-241° C.) to produce an 0.55-0.65 mil thick high gloss coating on the metal substrate.

Each of the coated metal substrates of Examples 1 to 4 were subjected to the aforementioned salt immersion, QUV and 2T bending tests. Each of coatings produced essentially no hazing, clouding, flaking or delamination in the salt immersion test. In the QUV testing each of the coated metal substrates was essentially free of hazing, mottling and delamination even after 2000 hours. All the coating exhibited high gloss i.e. ≧80% reflectance at 60°. No cracking or delamination of the coatings were observed in the bending test.

When the coating compositions of the examples are applied as coil coatings to bright, untreated, sealed, anodized aluminum coils, the coated coils are essentially free of blocking or sticking and unroll easily for use. Such coated aluminum coil substrates have been fabricated into auto trim parts subsequent to coil coating without any problems with the integrity of the adhesiveness of the coating.

Additionally, the coatings are mar resistant and printable.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A high gloss coating composition comprising a catalyst-free mixture of:
 a high gloss, thermosetting, hydroxyl group-containing fluorocarbon polymer,
 a cross-linking agent comprising a blocked aliphatic polyisocyanate, a partially self-condensing, highly methylated melamine-formaldehyde resin or a mixture thereof,
 butanol solvent,
 an ultraviolet screening agent and an ultraviolet stabilizer acting as a free radical scavenger.

2. A high gloss coating composition according to claim 1 additionally comprising one or more of the following components: polysiloxane slip and flow and defoaming agents, a high boiling solvent distilling at a temperature of about 195° C. or above and an amine inhibitor for residual acid in the fluoropolymer.

3. A high gloss coating composition according to claim 1 wherein the fluoropolymer is basically an amorphous and alternating thermosetting polymer of a fluoroolefin, alkyl vinyl ether, and hydroxyvinyl ether.

4. A high gloss coating composition according to claim 1 wherein the fluoropolymer is basically an amorphous and alternating thermosetting polymer of a fluoroolefin, alkyl vinyl ether, hydroxyvinyl ether and a dibasic acid anhydride.

5. A high gloss coating composition according to claim 2 wherein the fluoropolymer is basically an amorphous and alternating thermosetting polymer of a fluoroolefin, alkyl vinyl ether, hydroxyvinyl ether and a dibasic acid anhydride.

6. A high gloss coating composition according to claim 4 wherein the cross-linking agent comprises about 5 to about 15% by weight of the total coating composition of a methyl ethyl ketoxime blocked hexamethylene diisocyanate trimer., from about 0.75% to about 15% by weight based on the total solids content of the coating composition of a highly methylated melamine-formaldehyde resin or a mixture of the polyisocyanate and melamine-formaldehyde resin in a solids weight ratio of polyisocyanate/melamine-formaldehyde resin of from about 2.00:1 to about 3.25:1 and wherein the butanol solvent is present in an amount of from about 5 to about 25% by weight of the total resin solids in the composition, the ultraviolet screening agent is 2-[4,6-bis(2,4-dimethylphenyl)-1,3,5-triazinyl-2-yl]-5-(octyloxy)-phenol present in an amount up to about 3% by weight of the total resin solids present in the composition and the ultraviolet stabilizer is N-(N-acetyl-2,2,6,6-tetramethyl piperidyl)-4-dodecyl-2,5-pyrrolidinedione present in an amount up to about 3% by weight of the total resin solids present in the composition.

7. A high gloss coating composition according to claim 5 wherein the cross-linking agent comprises about 5 to about 15% by weight of the total coating composition of a methyl ethyl ketoxime blocked hexamethylene diisocyanate trimer, from about 0.75% to about 15% by weight based on the total solids content of the coating composition of a highly methylated melamine-formaldehyde resin or a mixture of the polyisocyanate and melamine-formaldehyde resin in a solids weight ratio of polyisocyanate/melamine-formaldehyde resin of from about 2.00:1 to about 3.25:1 and wherein the butanol solvent is present in an amount of from about 5 to about 25% by weight of the total resin solids in the composition, the ultraviolet screening agent is 2-[4,6-bis(2,4-dimethylphenyl)-1,3,5-triazinyl-2-yl]-5-(octyloxy)-phenol present in an amount up to about 3% by weight of the total resin solids present in the composition and the ultraviolet stabilizer is N-(N-acetyl-2,2,6,6-tetramethyl piperidyl)-4-dodecyl-2,5-pyrrolidinedione present in an amount up to about 3% by weight of the total resin solids present in the composition.

8. A high gloss coating composition according to claim 2 wherein the high boiling solvent is a mixture of dimethyl esters of adipic, glutaric and succinic acids, having a distillation range of about 196° to 225° C., the amine inhibitor is diisopropanolamine present in an amount to inhibit residual acid in the fluoropolymer from prematurely initiating cross-linking, the defoaming agent is a polyether modified methylalkylpolysiloxane copolymer and the slip and flow additive is a polyester modified polydimethylsiloxane, the defoaming agent and slip and flow additive each being present in an amount of from about 0.05 to about 0.20% by weight based on the total weight of the coating composition.

9. A high gloss coating composition according to claim 4 wherein the high boiling solvent is a mixture of dimethyl esters of adipic, glutaric and succinic acids, having a distillation range of about 196° to 225° C., the amine inhibitor is diisopropanolamine present in an amount to inhibit residual acid in the fluoropolymer from prematurely initiating cross-linking, the defoaming agent is a polyether modified methylalkylpolysiloxane copolymer and the slip and flow additive is a polyester modified polydimethylsiloxane, the defoaming agent and slip and flow additive each being present in an amount of from about 0.05 to about 0.20% by weight based on the total weight of the coating composition.

10. A high gloss coating composition according to claim 5 wherein the high boiling solvent is a mixture of dimethyl esters of adipic, glutaric and succinic acids, having a distillation range of about 196° to 225° C., the amine inhibitor is diisopropanolamine present in an amount to inhibit residual acid in the fluoropolymer from prematurely initiating cross-linking, the defoaming agent is a polyether modified methylalkylpolysiloxane copolymer and the slip and flow additive is a polyester modified polydimethylsiloxane, the defoaming agent and slip and flow additive each being present in an amount of from about 0.05 to about 0.20% by weight based on the total weight of the coating composition.

11. A high gloss coating composition according to claim 7 wherein the high boiling solvent is a mixture of dimethyl esters of adipic, glutaric and succinic acids, having a distillation range of about 196° to 225° C., the amine inhibitor is diisopropanolamine present in an amount to inhibit residual acid in the fluoropolymer from prematurely initiating cross-linking, the defoaming agent is a polyether modified methylalkylpolysiloxane copolymer and the slip and flow additive is a polyester modified polydimethylsiloxane, the defoaming agent and slip and flow additive each being present in an amount of from about 0.05 to about 0.20% by weight based on the total weight of the coating composition.

12. A high gloss coating composition according to claim 9 wherein the fluoropolymer is a polymer produced from tetrafluoroethylene or chlorotrifluoroethylene as the fluoroolefin, and ethyl, butyl or cyclohexyl vinyl ethers as the alkyl vinyl ether, hydroxyethyl vinyl ether and succinic anhydride, said fluoropolymer characterized by a fluorine content of from about 20 to about 30% by weight, a hydroxyl value of from about 52 to about 57 mg KOH/g of solids, a carboxy value of from about zero up to about 5 mg KOH/g solids and a number average molecular weight of about 20,000, the blocked polyisocyanate has a blocked NCO content of about 11.3% and is present in the coating composition in an amount of about 11% by weight based on the weight of the total coating composition, the melamine-formaldehyde resin has an X-$Z_1$ viscosity (Gardner-Holt, 25° C.), a specific gravity of resins solid of about 1.24 and has a low methylol content and is present in the coating composition in an amount of about 5% by weight based on the total solids contents of the coating composition and the mixture of polyisocyanate/melamine-formaldehyde is employed at a weight ratio of about 2.2:1 by weight on a solids basis and in an amount of about 11% by weight of the total solids content of the coating composition and wherein the butanol is present in an amount of about 15% by weight of the total resin solids in the composition, the amine inhibitor is present in an amount of about 0.1% by weight based on the total coating composition and the defoaming and slip and flow agents are present in an amount of about 0.1% each by weight based on the total coating composition.

13. A high gloss coating composition according to claim 10 wherein the fluoropolymer is a polymer produced from tetrafluoroethylene or chlorotrifluoroethylene as the fluoroolefin, and ethyl, butyl or cyclohexyl vinyl ethers as the alkyl vinyl ether, hydroxyethyl vinyl ether and succinic anhydride, said fluoropolymer characterized by a fluorine content of from about 20 to about 30% by weight, a hydroxyl value of from about 52 to about 57 mg KOH/g of solids, a carboxy value of from about zero up to about 5 mg KOH/g solids and a number average molecular weight of about 20,000, the blocked polyisocyanate has a blocked NCO content of about 11.3% and is present in the coating composition in an amount of about 11% by weight based on the weight of the total coating composition, the melamine-formaldehyde resin has an X-$Z_1$ viscosity (Gardner-Holt, 25° C.), a specific gravity of resins solid of about 1.24 and has a low methylol content and is present in the coating composition in an amount of about 5% by weight based on the total solids contents of the coating composition and the mixture of polyisocyanate/melamine-formaldehyde is employed at a weight ratio of about 2.2:1 by weight on a solids basis and in an amount of about 11% by weight of the total solids content of the coating composition and wherein the butanol is present in an amount of about 15% by weight of the total resin solids in the composition, the amine inhibitor is present in an amount of about 0.1% by weight based on the total coating composition and the defoaming and slip and flow agents are present in an amount of about 0.1% each by weight based on the total coating composition.

14. A high gloss coating composition according to claim 11 wherein the fluoropolymer is a polymer produced from tetrafluoroethylene or chlorotrifluoroethylene as the fluoroolefin, and ethyl, butyl or cyclohexyl vinyl ethers as the alkyl vinyl ether, hydroxyethyl vinyl ether and succinic anhydride, said fluoropolymer characterized by a fluorine content of from about 20 to about 30% by weight, a hydroxyl value of from about 52 to about 57 mg KOH/g of solids, a carboxy value of from about zero up to about 5 mg KOH/g solids and a number average molecular weight of about 20,000, the blocked polyisocyanate has a blocked NCO content of about 11.3% and is present in the coating composition in an amount of about 11% by weight based on the weight of the total coating composition, the melamine-formaldehyde resin has an X-$Z_1$ viscosity (Gardner-Holt, 25° C.), a specific gravity of resins solid of about 1.24 and has a low methylol content and is present in the coating composition in an amount of about 5% by weight based on the total solids contents of the coating composition and the mixture of polyisocyanate/melamine-formaldehyde is employed at a weight ratio of about 2.2:1 by weight on a solids basis and in an amount of about 11% by weight of the total solids content of the coating composition and wherein the butanol is present in an amount of about 15% by weight of the total resin solids in the composition, the amine inhibitor is present in an amount of about 0.1% by weight based on the total coating composition and the defoaming and slip and flow agents are present in an amount of about 0.1% each by weight based on the total coating composition.

15. A high gloss coating composition of claim 14 comprising, in parts by weight, about 86.05 parts fluoropolymer, about 4.10 part blocked polyisocyanate, about 1.72 parts melamine-formaldehyde resin, about 1.24 parts ultraviolet screening agent, about 0.40 part ultraviolet stabilizer acting as a free radical scavenger, about 5.92 parts butanol, about 0.10 part diisopropanolamine, about 0.1 part polyether modified methylalkylpolysiloxane copolymer, about 0.10 part polyester modified polydimethylsiloxane and sufficient amount of the high boiling solvent to adjust the viscosity of the composition to about 28–32 sec., #4 Zahn.

16. A high gloss coated untreated, bright, sealed, anodized metal substrate coated with a high gloss coating, wherein said high gloss coating is formed from a high gloss coating composition comprising a catalyst-free mixture of:
a high gloss, thermosetting, hydroxyl group-containing fluorocarbon polymer,
a cross-linking agent comprising a blocked aliphatic polyisocyanate, a partially self-condensing, highly methylated melamine-formaldehyde resin or a mixture thereof,
butanol solvent,
an ultraviolet screening agent and
an ultraviolet stabilizer acting as a free radical scavenger.

17. A high gloss coated untreated, bright, sealed, anodized metal substrate according to claim 16 wherein the coating composition additionally comprises one or more of the following components: polysiloxane slip and flow and defoaming agents, a high boiling solvent distilling at a temperature of about 195° C. or above and an amine inhibitor for residual acid in the fluoropolymer.

18. A high gloss coated untreated, bright, sealed, anodized metal substrate according to claim 17 wherein the fluoropolymer is basically an amorphous and alternating thermosetting polymer of a fluoroolefin, alkyl vinyl ether, hydroxyvinyl ether and a dibasic acid anhydride.

19. A high gloss coated untreated, bright, sealed, anodized metal substrate according to claim 18 the cross-linking agent comprises about 5 to about 15% by weight of the total coating composition of a methyl ethyl ketoxime blocked hexamethylene diisocyanate trimer, from about 0.75% to about 15% by weight based on the total solids content of the coating composition of a highly methylated melamine-formaldehyde resin or a mixture of the polyisocyanate and melamine-formaldehyde resin in a solids weight ratio of polyisocyanate/melamine-formaldehyde resin of from about 2.00:1 to about 3.25:1 and wherein the butanol solvent is present in an amount of from about 5 to about 25% by weight of the total resin solids in the composition, the ultraviolet screening agent is 2-[4,6-bis-(2,4-dimethylphenyl)-1,3,5-triazinyl-2-yl]-5-(octyloxy)-phenol present in an amount up to about 3% by weight of the total resin solids present in the composition and the ultraviolet stabilizer is N-(N-acetyl-2,2,6,6-tetramethyl piperidyl)-4-dodecyl-2,5-pyrrolidinedione present in an amount up to about 3% by weight of the total resin solids present in the composition.

20. A high gloss coated untreated, bright, sealed, anodized metal substrate according to claim 19 wherein the high boiling solvent is a mixture of dimethyl esters of adipic, glutaric and succinic acids, having a distillation range of about 196° to 225° C., the amine inhibitor is diisopropanolamine present in an amount to inhibit residual acid in the fluoropolymer from prematurely initiating cross-linking, the defoaming agent is a polyether modified methylalkylpolysiloxane copolymer and the slip and flow additive is a polyester modified polydimethylsiloxane, the defoaming agent and slip and flow additive each being present in an amount of from about 0.05 to about 0.20% by weight based on the total weight of the coating composition.

21. A high gloss coated untreated, bright, sealed, anodized metal substrate according to claim 20 wherein the fluoropolymer is a polymer produced from tetrafluoroethylene or chlorotrifluoroethylene as the fluoroolefin, and ethyl, butyl or cyclohexyl vinyl ethers as the alkyl vinyl ether, hydroxyethyl vinyl ether and succinic anhydride, said fluoropolymer characterized by a fluorine content of from about 20 to about 30% by weight, a hydroxyl value of from about 52 to about 57 mg KOH/g of solids, a carboxy value of from about zero up to about 5 mg KOH/g solids and a number average molecular weight of about 20,000, the blocked polyisocyanate has a blocked NCO content of about 11.3% and is present in the coating composition in an amount of about 11% by weight based on the weight of the total coating composition, the melamine-formaldehyde resin has an X-$Z_1$ viscosity (Gardner-Holt, 25° C.), a specific gravity of resins solid of about 1.24 and has a low methylol content and is present in the coating composition in an amount of about 5% by weight based on the total solids contents of the coating composition and the mixture of polyisocyanate/melamine-formaldehyde is employed at a weight ratio of about 2.2:1 by weight on a solids basis and in an amount of about 11% by weight of the total solids content of the coating composition and wherein the butanol is present in an amount of about 15% by weight of the total resin solids in the composition, the amine inhibitor is present in an amount of about 0.1% by weight based on the total coating composition and the defoaming and slip and flow agents are present in an amount of about 0.1% each by weight based on the total coating composition.

22. A high gloss coated untreated, bright, sealed, anodized metal substrate according to claim 21 wherein the coating composition comprises, in parts by weight, about 86.05 parts fluoropolymer, about 4.10 part blocked polyisocyanate, about 1.72 parts melamine-formaldehyde resin, about 1.24 parts ultraviolet screening agent, about 0.40 part ultraviolet stabilizer acting as a free radical scavenger, about 5.92 parts butanol, about 0.10 part diisopropanolamine, about 0.1 part polyether modified methylalkylpolysiloxane copolymer, about 0.10 part polyester modified polydimethylsiloxane and sufficient amount of the high boiling solvent to adjust the viscosity of the composition to about 28-32 sec., #4 Zahn.

23. A high gloss coated untreated, bright, sealed, anodized metal substrate according to claim 16 wherein the metal is aluminum in coil form.

24. A high gloss coated untreated, bright, sealed, anodized metal substrate according to claim 21 wherein the metal is aluminum in coil form.

25. A high gloss coated untreated, bright, sealed, anodized metal substrate according to claim 22 wherein the metal is aluminum in coil form.

26. A process for providing a high gloss coating on an untreated, bright, sealed, anodized metal coil substrate comprising:
applying to the metal coil substrate, with sufficient heating to produce a peak metal temperature of about 450° F. (232° C.) or above to produce a cured high gloss coating, a high gloss coating composition comprising a catalyst-free mixture of:
a high gloss, thermosetting, hydroxyl group-containing fluorocarbon polymer,
a cross-linking agent comprising a blocked aliphatic polyisocyanate, a partially self-condensing, highly methylated melamine-formaldehyde resin or a mixture thereof,
butanol solvent,
an ultraviolet screening agent and
an ultraviolet stabilizer acting as a free radical scavenger.

27. A process for providing a high gloss coating on an untreated, bright, sealed, anodized metal coil substrate according to claim 26 wherein the high gloss coating composition additionally comprise one or more of the following components: polysiloxane slip and flow and defoaming agents, a high boiling solvent distilling at a temperature of about 195° C. or above and an amine inhibitor for residual acid in the fluoropolymer.

28. A process for providing a high gloss coating on an untreated, bright, sealed, anodized metal coil substrate according to claim 27 wherein the high gloss coating composition comprises, in parts by weight, about 86.05 parts fluoropolymer, about 4.10 part blocked polyisocyanate, about 1.72 parts melamine-formaldehyde resin, about 1.24 parts ultraviolet screening agent, about 0.40 part ultraviolet stabilizer acting as a free radical scavenger, about 5.92 parts butanol, about 0.10 part diisopropanolamine, about 0.1 part polyether modified methylalkylpolysiloxane copolymer, about 0.10 part polyester modified polydimethylsiloxane and sufficient amount of the high boiling solvent to adjust the viscosity of the composition to about 28-32 sec., #4 Zahn.

29. A process according to claim 26 wherein the metal coil substrate is an aluminum coil substrate.

30. A process according to claim 27 wherein the metal coil substrate is an aluminum coil substrate.

31. A process according to claim 28 wherein the metal coil substrate is an aluminum coil substrate.

* * * * *